United States Patent
Armstrong

(10) Patent No.: US 10,359,989 B2
(45) Date of Patent: Jul. 23, 2019

(54) PORTABLE STUDIO ASSEMBLY

(71) Applicant: Brandyn Armstrong, Cleveland, OH (US)

(72) Inventor: Brandyn Armstrong, Cleveland, OH (US)

(*) Notice: Subject to any disclaimer, the term of this patent is extended or adjusted under 35 U.S.C. 154(b) by 29 days.

(21) Appl. No.: 15/136,340

(22) Filed: Apr. 22, 2016

(65) Prior Publication Data

US 2016/0360303 A1 Dec. 8, 2016

Related U.S. Application Data

(60) Provisional application No. 62/170,328, filed on Jun. 3, 2015.

(51) Int. Cl.
| | |
|---|---|
| *G06F 3/16* | (2006.01) |
| *H04R 1/34* | (2006.01) |
| *H04R 1/08* | (2006.01) |
| *G06F 1/16* | (2006.01) |
| *H04R 1/30* | (2006.01) |

(52) U.S. Cl.
CPC .......... *G06F 3/165* (2013.01); *G06F 1/1684* (2013.01); *H04R 1/342* (2013.01); *H04R 1/08* (2013.01); *H04R 1/30* (2013.01); *H04R 2499/11* (2013.01)

(58) Field of Classification Search
CPC .......... A45C 13/02; A45C 9/00; G10K 11/16; H04R 1/086; H04R 1/28; H04R 1/342; G10H 1/02; H04M 1/19; G06F 3/165; A47B 19/002
See application file for complete search history.

(56) References Cited

U.S. PATENT DOCUMENTS

| | | | |
|---|---|---|---|
| 1,405,287 A | 1/1922 | Clifford | |
| 1,630,870 A | 5/1927 | Strunck | |
| 2,156,489 A * | 5/1939 | Bonetti | A47B 19/002 248/185.1 |
| 2,459,785 A | 4/1945 | Allerton | |

(Continued)

OTHER PUBLICATIONS

VB2GO, Carry-On Vocal Booth Pro Images, Aug. 30, 2013, www.vocalboothtogo.com, pp. 1-8.*

(Continued)

*Primary Examiner* — Md S Elahee
*Assistant Examiner* — Angelica M McKinney
(74) *Attorney, Agent, or Firm* — Eschweiler & Potashnik, LLC

(57) ABSTRACT

A portable audio studio used in conjunction with a cell, wireless or mobile device (e.g., a mobile phone) having a music recording application, a microphone, pop filter, foam filter, stand sticks, a base and other components in order to give songs a higher quality and portability of audio design studio in with one modular and portable assembly unit or kit. The hardware consists of a small case that holds inside an expanding cell phone stand that can be used for a cellphone or microphone stand, a microphone, and a pop filter. Once the case is emptied, the case can then be used to act as a reflective filter having various foam filters, for example, lining within. When the case can be closed with all components being housed inside, making it very portable, a user can carry the studio assembly to record music and audio at any time or location desired.

19 Claims, 20 Drawing Sheets

(56) References Cited

U.S. PATENT DOCUMENTS

| | | | |
|---|---|---|---|
| 2,481,264 A * | 9/1949 | Tulowiecki | A47B 19/002 |
| | | | 248/461 |
| 3,113,531 A | 12/1963 | Barnard | |
| 3,232,370 A | 2/1966 | Jaffe | |
| 3,415,476 A | 12/1968 | McDermott | |
| 3,562,929 A * | 2/1971 | Emore | A47B 41/00 |
| | | | 312/262 |
| 3,596,866 A * | 8/1971 | Baker | A47B 97/08 |
| | | | 190/11 |
| 3,630,309 A | 12/1971 | Wagner et al. | |
| 3,804,355 A | 4/1974 | Uroshevich | |
| 4,334,612 A * | 6/1982 | Beato | A45C 5/14 |
| | | | 190/18 A |
| 4,452,333 A | 6/1984 | Peavey et al. | |
| 4,471,933 A * | 9/1984 | Nelson | A45C 9/00 |
| | | | 248/461 |
| 4,671,478 A * | 6/1987 | Schoenig | F16B 7/0413 |
| | | | 16/19 |
| 4,744,536 A | 5/1988 | Bancalari | |
| 5,349,043 A | 9/1994 | Kuze et al. | |
| D365,825 S | 1/1996 | Abraham | |
| 5,713,553 A * | 2/1998 | Cooper | A47B 19/002 |
| | | | 248/170 |
| 5,832,079 A * | 11/1998 | Rabe | H04M 1/0216 |
| | | | 379/433.13 |
| 5,979,856 A | 11/1999 | Hsu | |
| 6,189,594 B1 | 2/2001 | Carter | |
| 6,264,161 B1 * | 7/2001 | Waggoner | A47B 19/002 |
| | | | 248/188.6 |
| D465,235 S | 11/2002 | Heid | |
| D477,930 S | 8/2003 | Minus | |
| 7,293,380 B2 | 11/2007 | Repecki | |
| D610,570 S | 2/2010 | Upham et al. | |
| 7,783,069 B1 * | 8/2010 | Miller | H04R 1/342 |
| | | | 381/345 |
| D627,166 S | 11/2010 | Fahim | |
| 8,069,946 B1 * | 12/2011 | Cruise, III | H04R 1/28 |
| | | | 181/198 |
| 8,198,523 B1 * | 6/2012 | Price | A47B 23/00 |
| | | | 84/453 |
| D672,958 S | 12/2012 | Denzinger | |
| 8,345,911 B2 | 1/2013 | Fulks | |
| D704,486 S | 5/2014 | Cho | |
| D716,764 S | 11/2014 | Jeon et al. | |
| D740,784 S | 10/2015 | O'Polka | |
| 9,282,386 B2 | 3/2016 | Low | |
| 9,318,086 B1 * | 4/2016 | Miller | G10H 1/02 |
| D774,022 S | 12/2016 | Huang | |
| D786,827 S | 5/2017 | Nesbit et al. | |
| 2002/0139066 A1 | 10/2002 | Szymanski et al. | |
| 2002/0166793 A1 * | 11/2002 | Carter | A45C 11/00 |
| | | | 206/764 |
| 2003/0127572 A1 * | 7/2003 | Meyer | H04R 1/083 |
| | | | 248/125.8 |
| 2005/0086842 A1 | 4/2005 | Ternovits et al. | |
| 2007/0175313 A1 | 8/2007 | Vandervliet | |
| 2008/0011344 A1 | 1/2008 | Barker | |
| 2008/0302599 A1 * | 12/2008 | Zou | G10K 11/168 |
| | | | 181/290 |
| 2011/0038594 A1 * | 2/2011 | Symons | G11B 20/00086 |
| | | | 386/224 |
| 2011/0058701 A1 * | 3/2011 | Fulks | F16M 11/10 |
| | | | 381/362 |
| 2012/0269503 A1 | 10/2012 | Hale | |
| 2013/0333976 A1 * | 12/2013 | Aliev | G10K 11/16 |
| | | | 181/198 |
| 2014/0064544 A1 * | 3/2014 | Zukowski | H04R 1/086 |
| | | | 381/360 |

OTHER PUBLICATIONS

VB2GO, Carry-On Vocal Booth Pro 2.0 Assembly and Use Instructions, Aug. 30, 2013, www.vocalboothtogo.com, pp. 1-2.*
Non-Final Office Action dated Oct. 16, 2018 in connection with Design U.S. Appl. No. 29/616,815.

* cited by examiner

STAND WITH TRIPOD -- 17

PORTABLE STUDIO ASSEMBLY

REFERENCE TO RELATED APPLICATIONS

This application claims the benefit of U.S. Provisional Application No. 62/170,328 filed Jun. 3, 2015, entitled "PORTABLE STUDIO ASSEMBLY", the contents of which are herein incorporated by reference in their entirety.

FIELD

This disclosure relates to the field of music recording hardware, and more specifically, a portable music studio assembly that allows users to compose high quality songs or audio on a cellular device or microphone at any location instead of at a single, fixed location as a traditional recording studio.

BACKGROUND

There are currently not many possible ways for music artists or even non-musicians to record their own high quality songs or audio conveniently at any time or any place. However, in order for them to accomplish this, they typically have to go to a professional recording studio, or create a homemade recording studio of their own. In addition, providing the expense and risk involved with such endeavor can prove to be inconvenient as people could have ideas of songs or any other types of audio that they would like to record as soon as possible, but incapable of traveling to a high quality recording studio, find time or part with the expense.

Others have tried to solve this problem by making music recording software that allows users to record quality songs right on their portable cellular devices. Although, this is a step towards a solution to the problem, the quality can still suffer from being as good as a professional studio. Thus, there is a need to provide hardware that will allow user to record high quality songs or audio conveniently.

DETAILED DESCRIPTION

Figure 1:
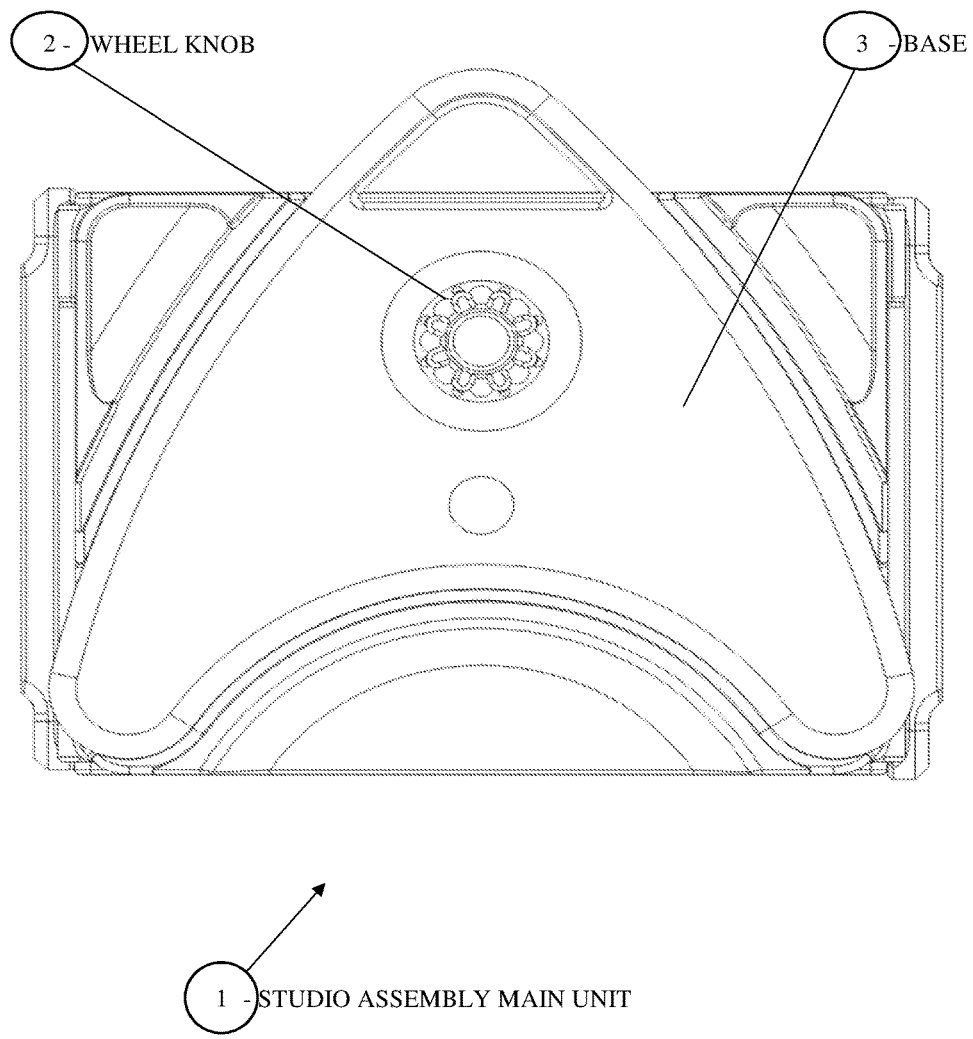
FIG. 1 is a perspective view, illustrating the front side of portable audio studio in accordance with various aspects being disclosed.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

The present disclosure seeks to provide hardware that will allow user to record high quality songs or audio conveniently by using their cell phones or a microphone in a portable manner. All devices or components can be operated from an external power sources or from an internal battery within the modular studio assembly unit or portable studio assembly, for example FIG. 1 illustrates how the top of a portable studio assembly as a main unit 1 (e.g., complete portable or carrying unit) before any implementation of assembly, or in other words before the main unit 1 as a single unit is transformed or assembled into the audio studio for recording songs, tracks, albums or the like, as well as generating various audio affects through any controls (e.g., equalizer controls, pedal controls, voice manipulations, audio compressions, recording or the like). FIG. 1, for example, can be viewed also as sectional cross section view within the portable audio studio as the main unit 1, or from outside of a side of the portable audio studio assembly 1 as the main unit 1. All contents can be included on the inside of the main unit 1 and/or attached to the outside of the main unit 1. Once all contents are removed and disassembled from the main unit 1, the portable studio assembly can then be put together as a portable music recording device, which is further described with reference to additional figures below.

The main unit 1 as illustrated can be a carrying case, portable kit/unit or portable assembly system that holds studio components that can be attached, detached, or assembled together as an audio studio. The main unit 1 can be configured as a portable audio studio assembly that can record and generate audio via microphone or mobile device. Although the main unit 1 can operate as a carrying case that holds all studio components, it can also have less than or more than the components or devices illustrated and described, as one of ordinary skill in the art can appreciate. For example, attached to or within the main unit 1 is a base 3, which can fully support or hold the other components within or able to attach to main unit 1. The base 3 can be held in place by the wheel knob 2, for example, which can rotate or screw in order to keep the base 3 and other components illustrated herein flush or taut within the case.

In one example, the wheel knob 2 can be turned slightly in order to release the base 3 from the main unit 1 as a separate piece that can lay flat to support other units at a variable height for recording via a mobile device, microphone or both. Other means by which to fasten or hold the base 3 within the main unit 1 are also envisioned, such as by clips, screws, ties, fasteners or other fastener devices, for example. When the portable studio assembly is ready to be used, the wheel knob 2 can be turned into an unlocking position so the base 3 can be released and utilized further assembly, such as by laying the base 3 flat and attaching other components or pieces of the assembly together to the base 3. When the product is not in use, the base 3 can then be placed unto the main unit 1 with the wheel knob 2 in locking position for reattachment with the other components discussed therein to be assembled as a single portable unit.

Although the base 3 is illustrated with a handle portion located in the top portion in a triangular corner of the base, other shapes and designs can also be envisioned. For example, the handle portion of the base 3 can comprise a groove or indention extending downward or into the entire studio assembly for a hand to fit into, or other configurations for easy carrying. In the present example, the top triangular portion of the base 3 includes a space cavity that can operate to carry or transport the portable studio assembly such as in a similar manner as a suitcase. However, other embodiments can also be envisioned as one of ordinary skill in the art can appreciate for ease of carrying.

Figure 2:
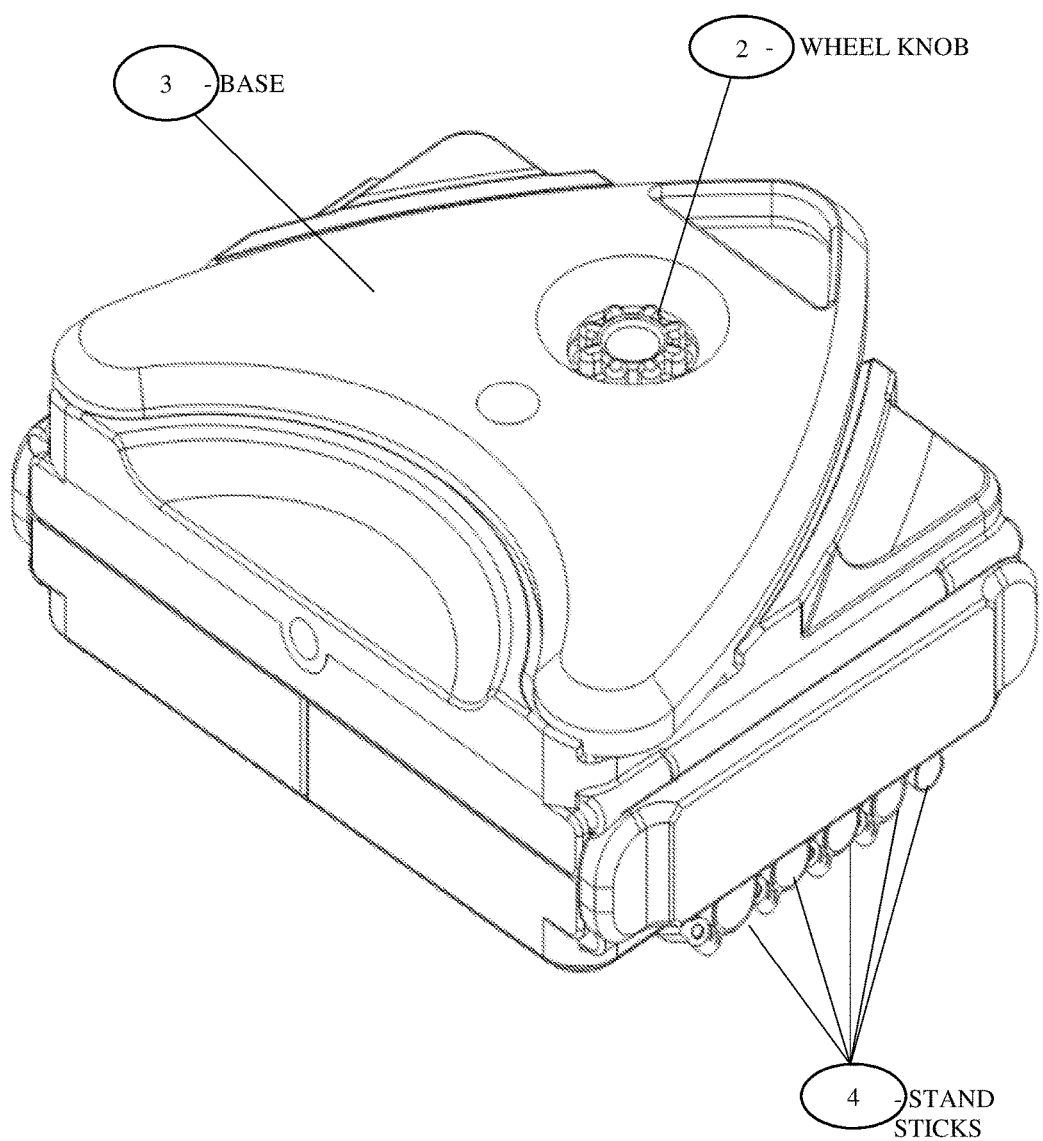
FIG. 2 is a perspective view of a portable audio studio at an angle in accordance with various aspects being disclosed.

FIG. 2 illustrates the main case 1 at another angle. At this angle, stand sticks 4 are illustrated at the bottom of the main unit 1, or at an opposite side of the assembly from the base 3. The stand sticks 4 can be removed, or otherwise unhinged and assembled together as a studio support stand or a combination of microphone, filters, and mobile phone stand for recording and designing of audio. In another embodiment, the stand sticks 4 can be scoped like a telescope to extend outward or inward to adjust a height of the assembly, and further set or fixed in height by one or more locking mechanisms (e.g., a screw knob with adjustment hole, a grip handle or the like).

Figure 3:
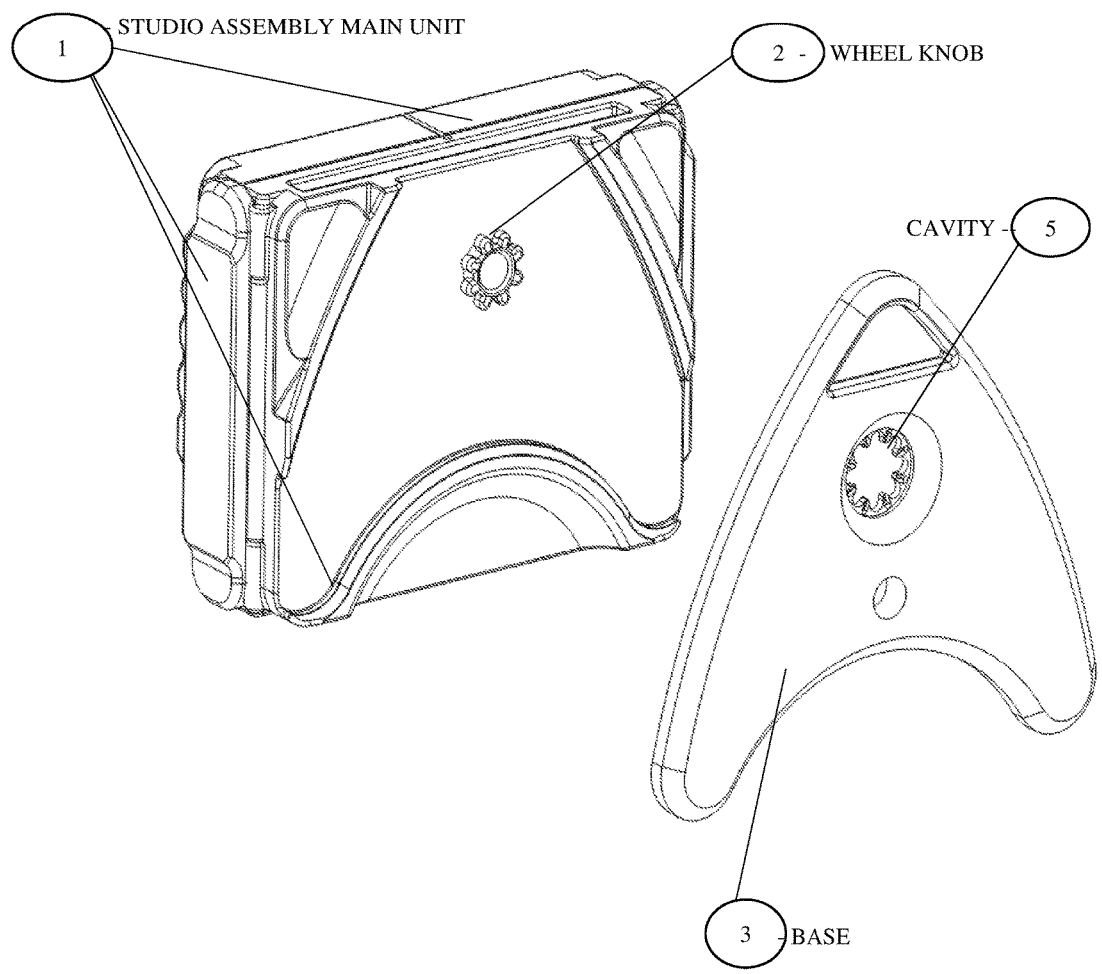
FIG. 3 is a perspective view, illustrating how the base disassembles from the main unit of a portable audio studio in accordance with various aspects being disclosed.

FIG. 3 illustrates the base 3 disconnected from the main unit 1. The base 3 can now be sat down or positioned flat on the floor so that the stand sticks 4 can be connected and inserted to make a stand for a cell phone and a microphone for recording and playing of audio. The stand sticks 4, for example, can fit into an opening or partial cavity 5 within the base 3, which can be seen below the portion where the wheel knob 2 fastened the base 3, or elsewhere on the base 3.

Figure 4:
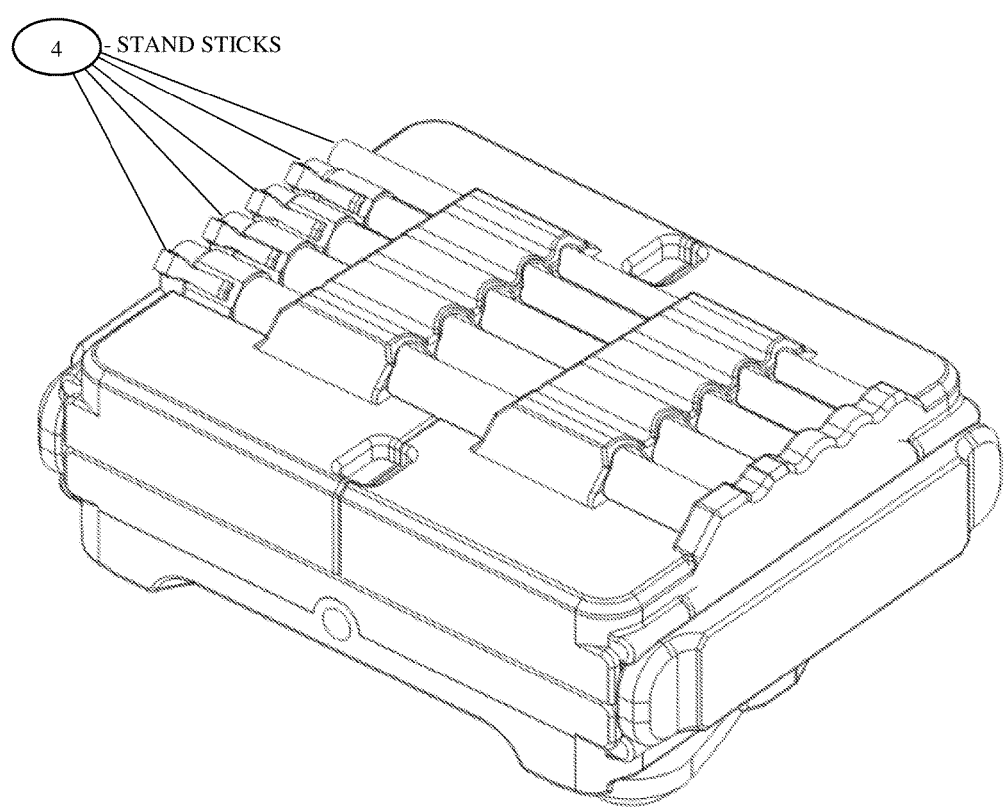
FIG. 4 is a perspective view illustrating a back of the main unit in accordance with various aspects being disclosed.

FIG. 4 illustrates the stand sticks 4 inserted onto the bottom of the main unit 1, or on an opposing side from the base 3. Once stand sticks 4 are removed (detailed in FIG. 6), they can be further connected to each other and connected to the base 3 in order to make the stand. The stand will be adjustable in order to adjust to the user's height and fastened together into a locked position.

Figure 5:
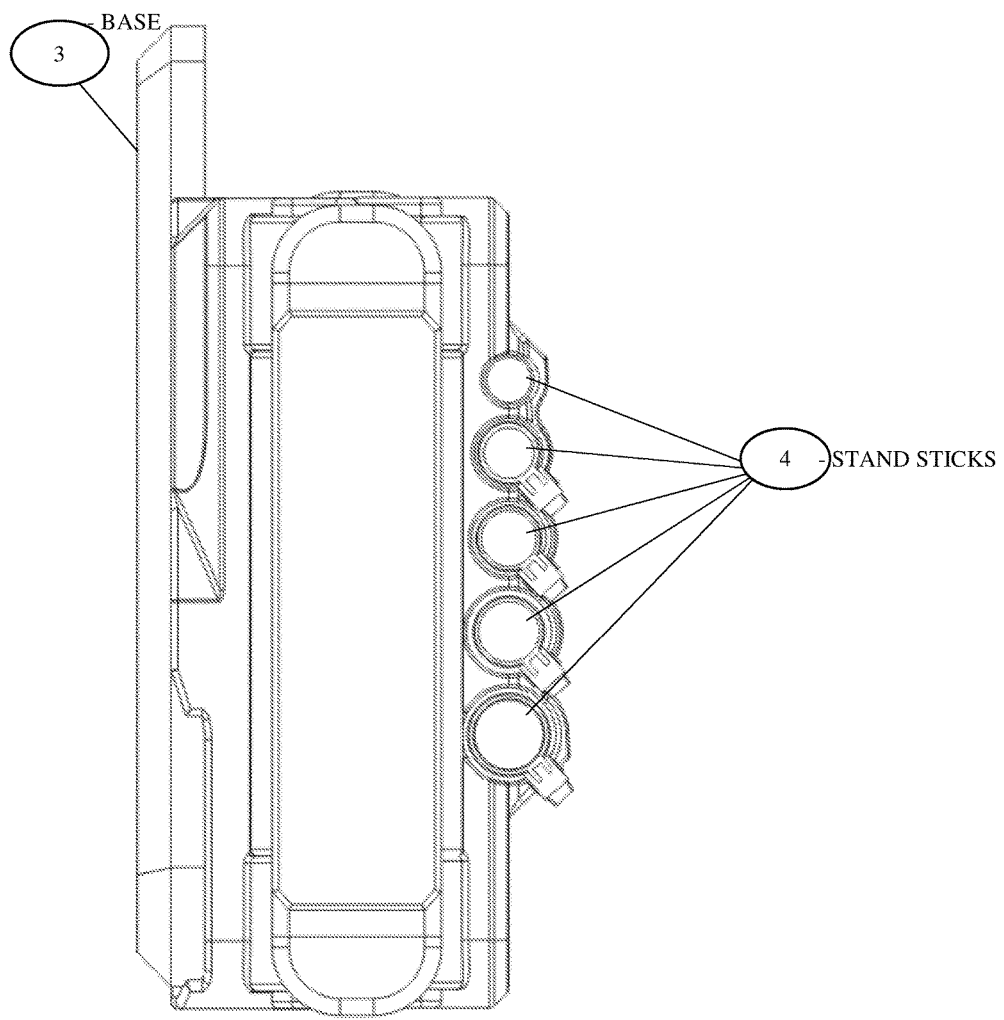
FIG. 5 is a perspective view, illustrating a portable audio studio from a side perspective in accordance with various aspects being disclosed.

FIG. 5 illustrates a side view of the studio assembly. The stand sticks can be hollow and vary in height and diameter. In another embodiment, the stand sticks can be a single telescoping stand stick 4 that extends outward at an adjustable height.

Figure 6:
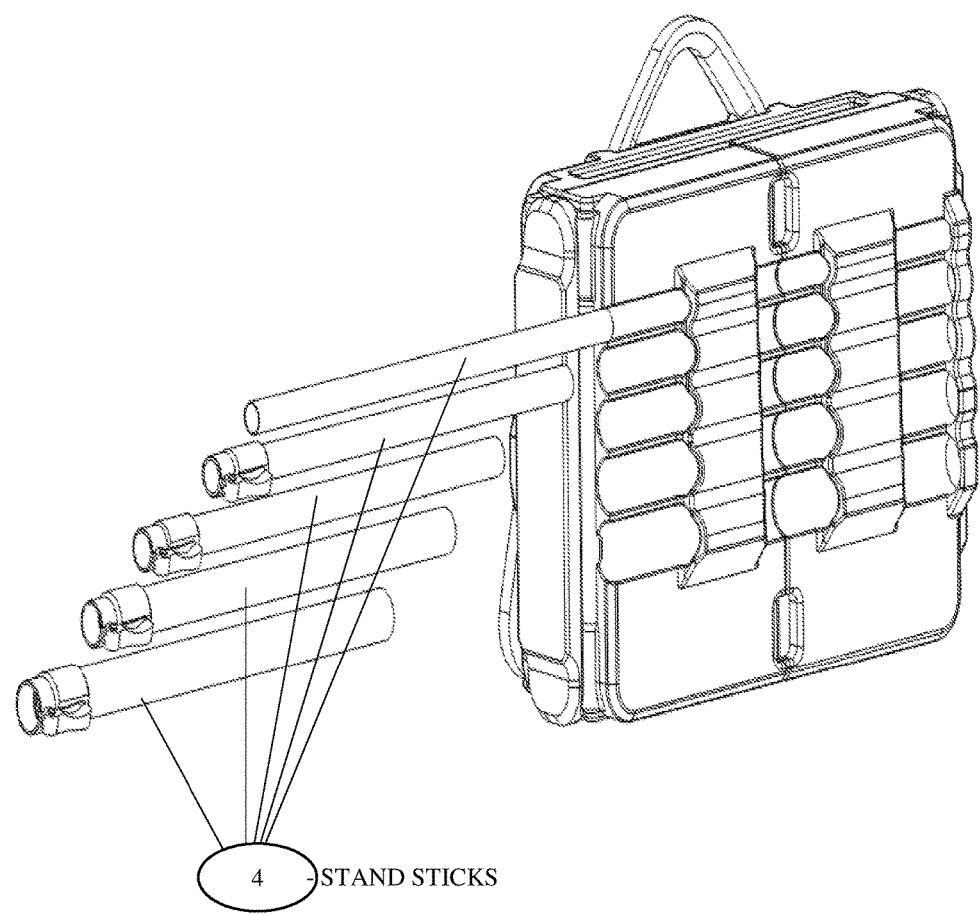
FIG. 6 illustrates an embodiment of how stand sticks slide out of the main case of a portable audio studio.

FIG. 6 illustrates removal of the stand sticks from the main unit 1. The stand sticks 4 are able to be slid out from secure fasteners, or ties based on the amount of height desired. Alternatively or additionally, the stand sticks 4 can be snapped into position for ease of carrying the portable studio assembly. Although the stand sticks 4 are illustrated as being on the opposite side as the base 3, they can also be positioned or located on the modular unit assembly (portable studio assembly of FIG. 6) on alternative sides, such as on an upper side of the base 3 surrounding the insert hole/cavity, or located on other sides, such as a lateral side, bottom or top proximate to the handle portion.

Figure 7:
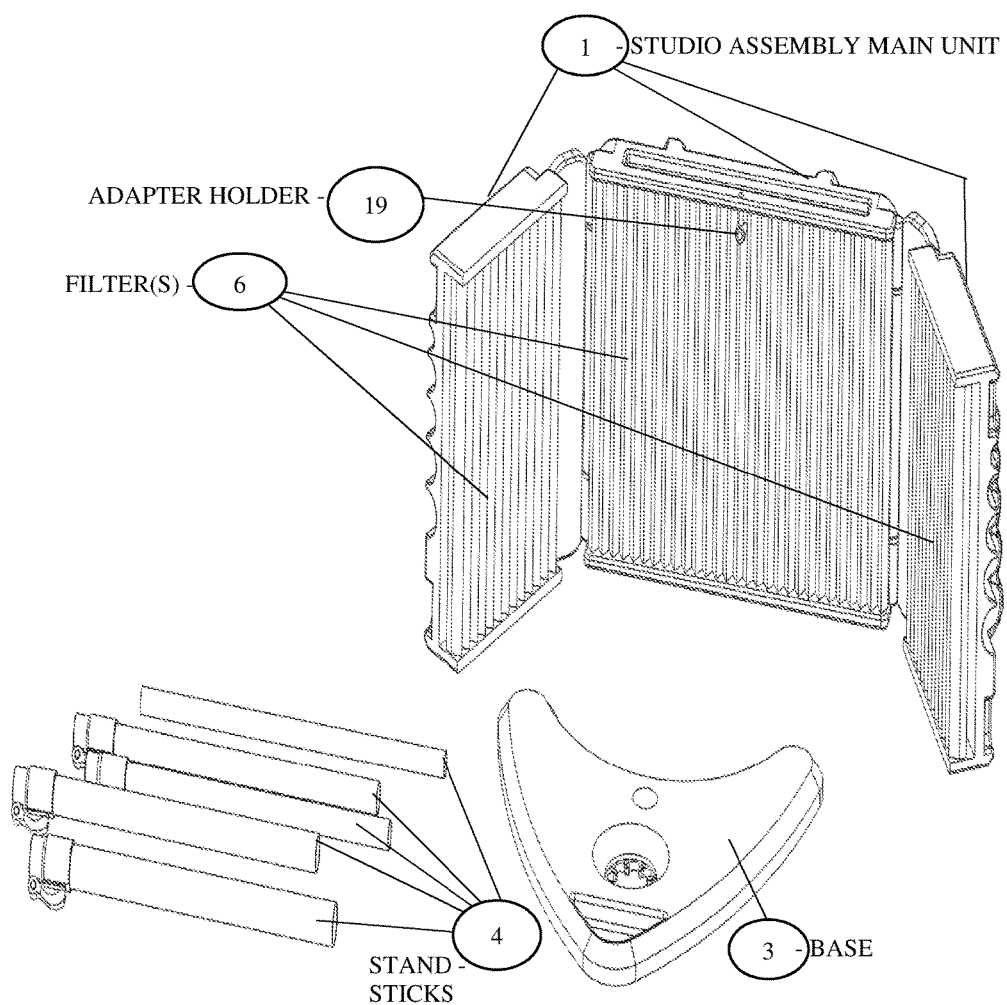
FIG. 7 illustrates an embodiment of a perspective view with the main unit open, which acts as a reflective filter that keeps sound from bouncing everywhere in a recording environment.

FIG. 7 illustrates all of the main contents disassembled from the case (kit, modular unit or the portable studio assembly). It also illustrates the main unit 1 open. The main unit 1 can be separated along the center portion underneath the holders for the stand sticks 4, for example, in which each portion on the left and right side can open and folded outward into three sections—a center section, a left section or right section. The degree in which the main unit 1 is unfolded can be adjustable to an optimum level for sound or audio recording and playing.

The inside of the main unit 1 can be lined with foam filters 6 within each section, which prevents vocals or audio from traveling all throughout the room due to the absorption capacity of the filters 6, which can additionally block out extra sound originating from external sources, for example, and focus any audio being recorded within the three sections into a recording device (mobile device, microphone or the like) being held thereat. The small circle in the top middle of the main unit 1 is the adaptor holder 19. This holder is made to connect the adaptor brackets that will hold a cell phone, microphone, or both at the same time, as well as any wiring connecting them for example.

In one embodiment, the foam filter can be surfaced within the main unit 1 with various foam filter elements, such as by one or more different shapes. For example, the foam filter elements within can be rectangular foam elements that traverse longitudinally from top to bottom, or other shapes, which can alternatively traverse laterally from left to right, or be segmented further throughout. Other shapes and designs of the foam filter can also be envisioned as one of ordinary skill in the art could appreciate in order to optimize the filtering of noise.

Figure 8:
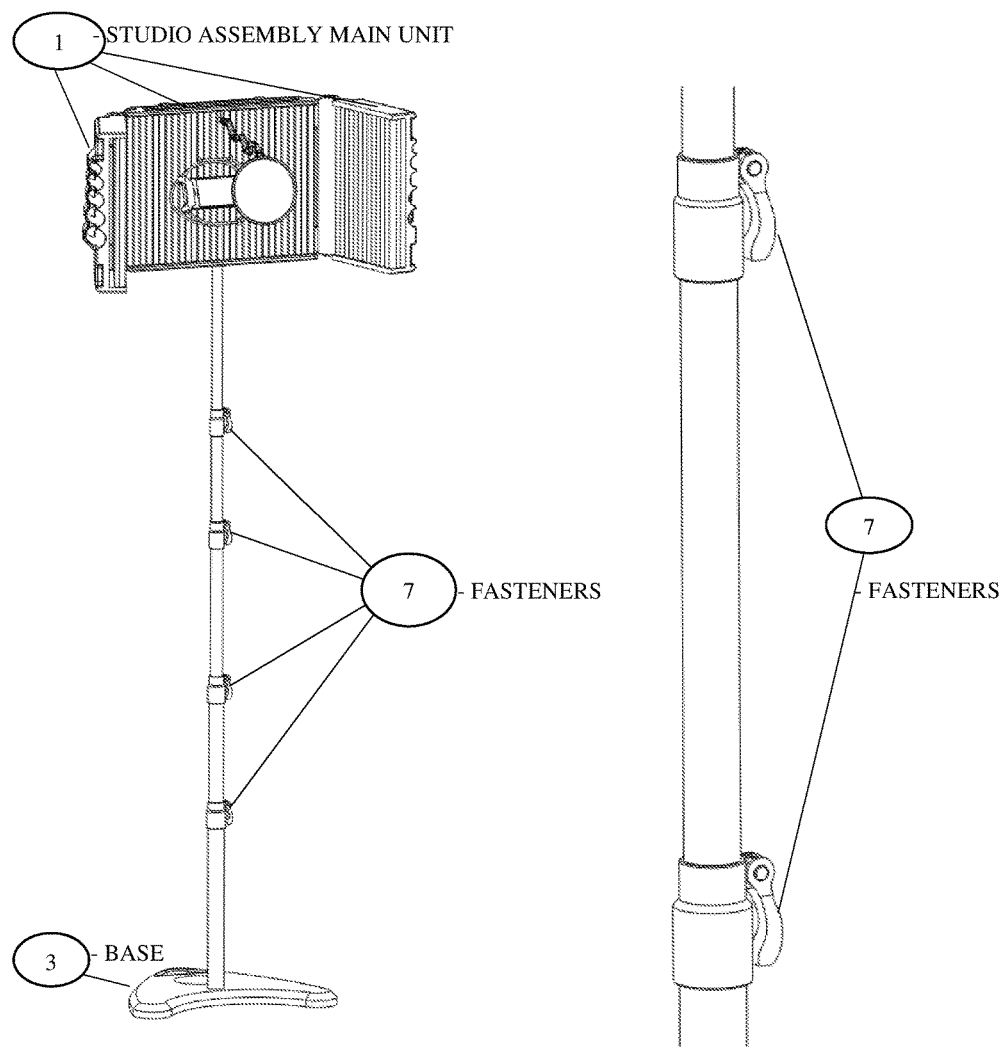
FIG. 8 illustrates an embodiment of an assembled view of the studio stick assembled completely together.

FIG. 8 illustrates the contents of the studio kit assembly fully assembled. This includes the base 3, stand sticks 4, and the main unit 1. Each of the stand sticks 4 comprise a stand lock 7, which enables each of them to be adjusted in height in order to be accustomed to the size of the person recording and locked with one another by a lock handle 7 or other fastener. Alternatively or additionally, the stand sticks could be screwed together, fastened by other means, or extended from one another telescopically while being fastened within one another at an end with a stop ridge or other mechanism.

Figure 9:
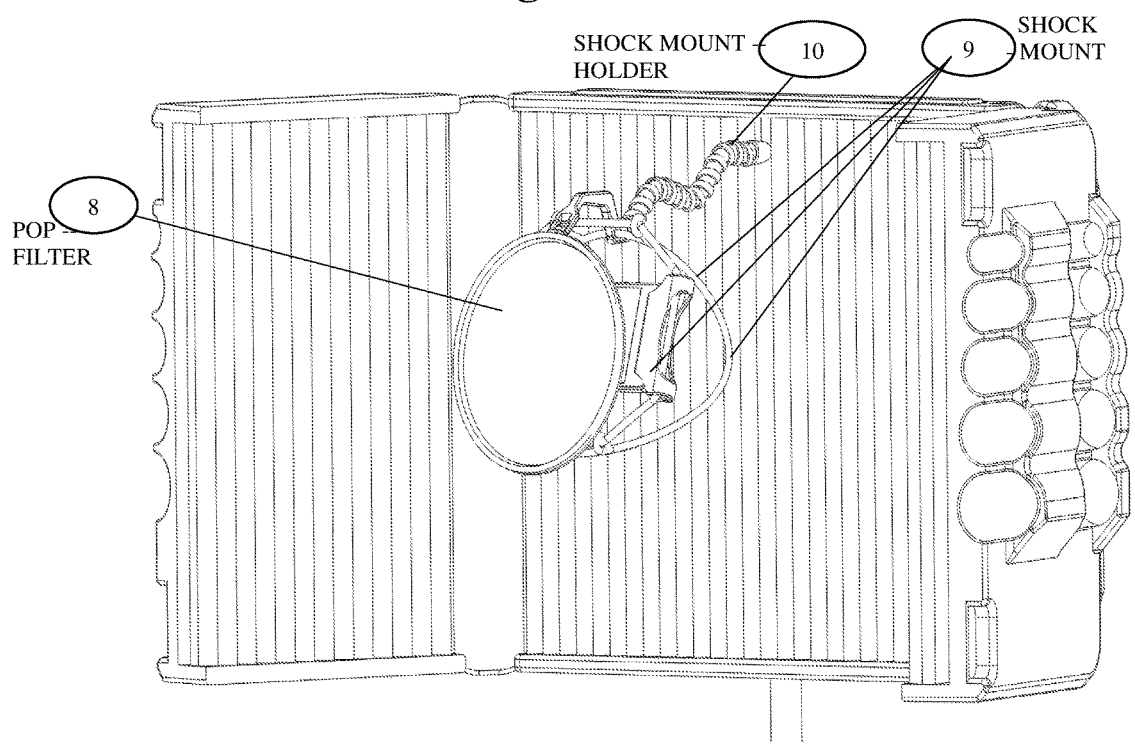
FIG. 9 illustrates an embodiment of a close up of the main unit and how pieces are assembled to create a high quality sound when recording.

FIG. 9 illustrates the bracket that is put into place when directly recording into a cell phone. The shock mount holder 10 is inserted into an adaptor holder and shock mount/phone holder 9, which can operate as a flexible piece to protect any wiring or adjust a bracket or shock mount 9 while holding it in place firmly at a desired position. The pop filter 8 and the shock mount/phone holder 9 are connected to the shock mount holder 10. The shock mount/phone holder 9 is used to hold cell phones into place. This also prevents vibration from traveling up the stand and interfering with the sound when recording. The pop filter 8 is used to prevent "plosives" when recording. It is used to enhance a vocal or voice and give a clearer, crisper sound when recording.

Figure 10:
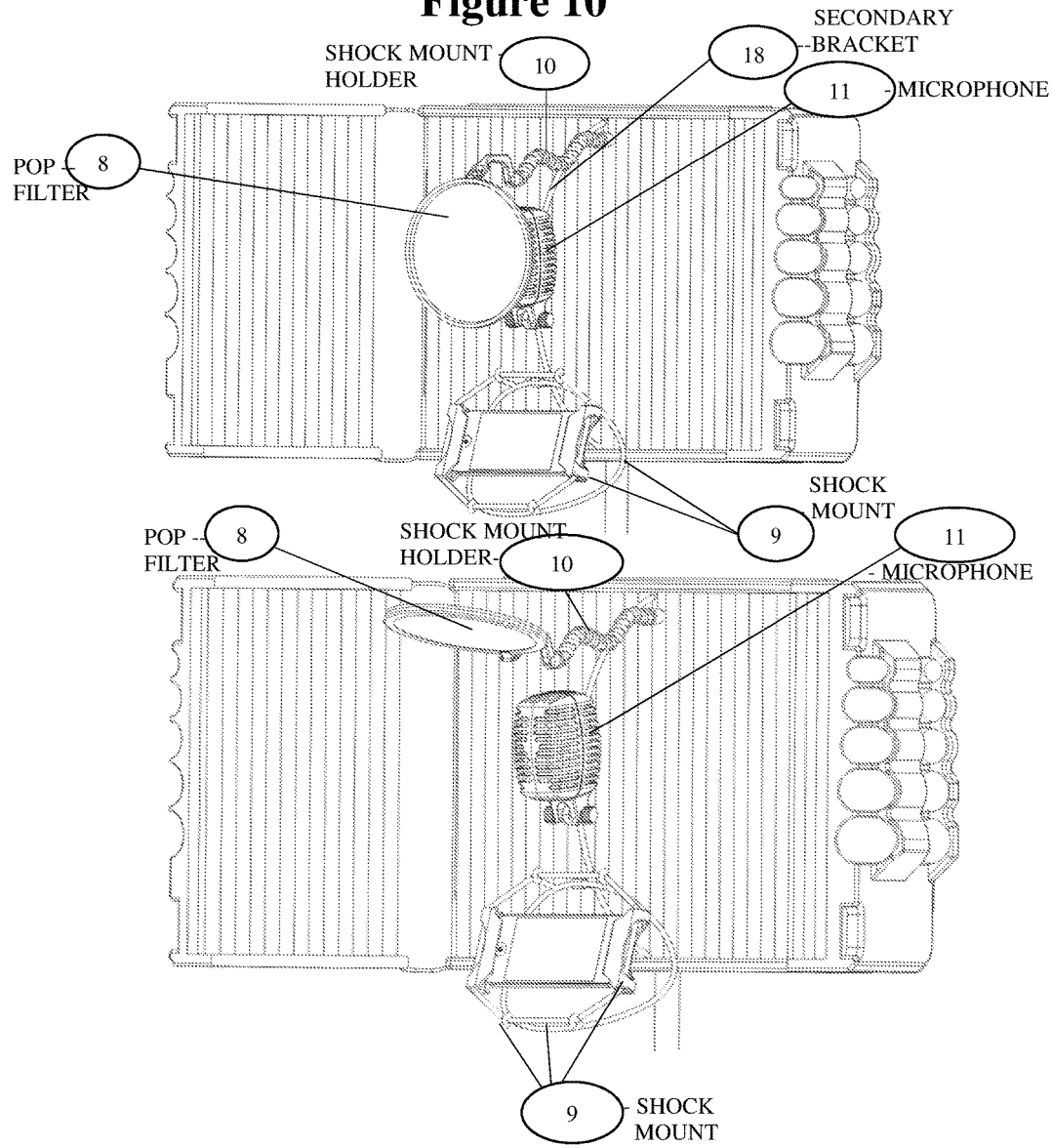
FIG. 10 illustrates an embodiment of a microphone being used in conjunction with phone and filters in order to record with an even higher sound quality.

FIG. 10 illustrates how brackets are put into place when the microphone 11 and mobile recording device (e.g., a mobile cell phone) used at the same time. This will make recording easier than only using a cell phone since the controls on the cell phone will be much more accessible since it is not behind the pop filter 8. A secondary bracket 18 is attached to the main unit 1, which allows the microphone 11 and the shock mount/phone holder 9 to connect at the same time. The two different depictions illustrated different positions and movement of the pop filter 8.

Figure 11:
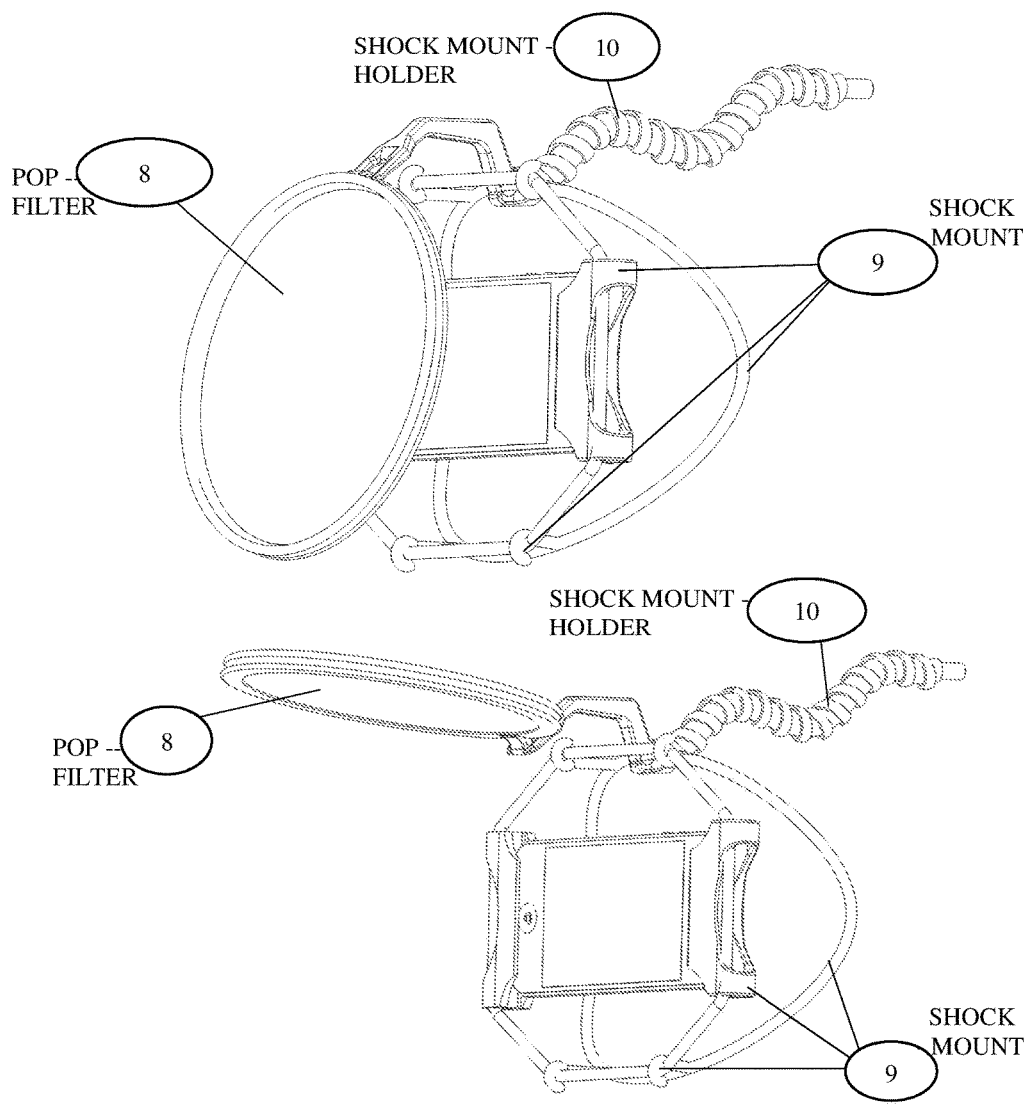
FIG. 11 illustrates embodiments of how the pop filter and shock mount operate.

FIG. 11 illustrates how the pop filter 8 has the ability to easily flip open. The pop filter 8 easily flips open so that users can have easy access to the control panel on the cell phone when recording, playing, pausing, editing, etc., based on an application or software program of the mobile device or wireless phone device. This also allows users easy access when wanting to remove the cell phone or the microphone 11 from the center bracket of the shock mount/phone holder 9, either by sliding in or out, or a snapped insertion.

Figure 12:
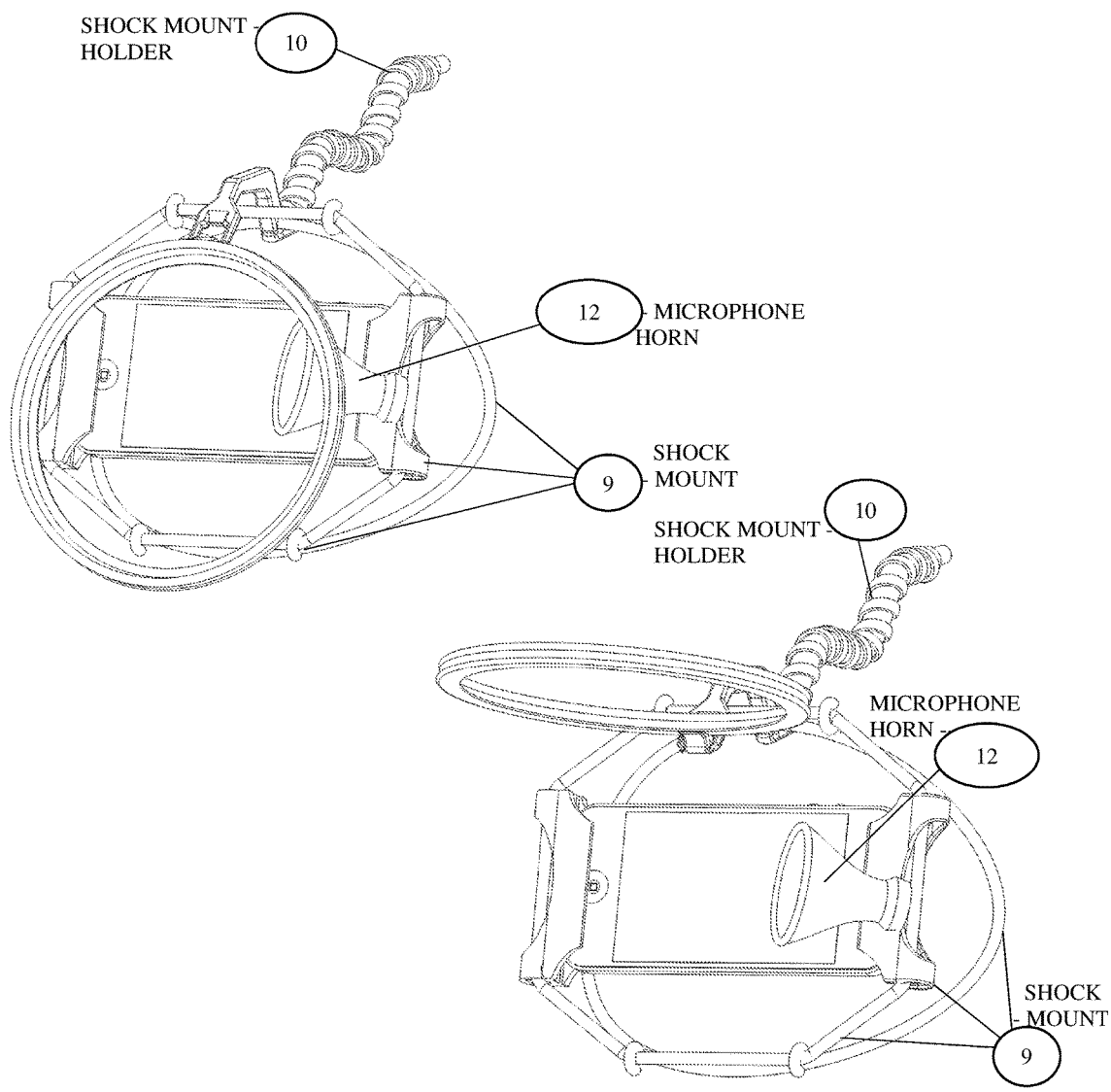
FIG. 12 illustrates an embodiment of how microphone horn can be connected to a cell phone in order to direct voice into a phone microphone when recording.

FIG. 12 illustrates a mic horn 12 that can be used to increase the quality of the cell phone recording. The mic horn 12 can be placed on the cell phone or wireless recording device positioned along the center of the shock mount/phone holder 9 (having a screen and a power button, for example) anywhere that the cell phone/microphone is located. The mic horn 12 can create a tunnel from the phone mic to the front of the phone or other recording device since the phone will be facing frontwards when users are recording.

Figure 13:
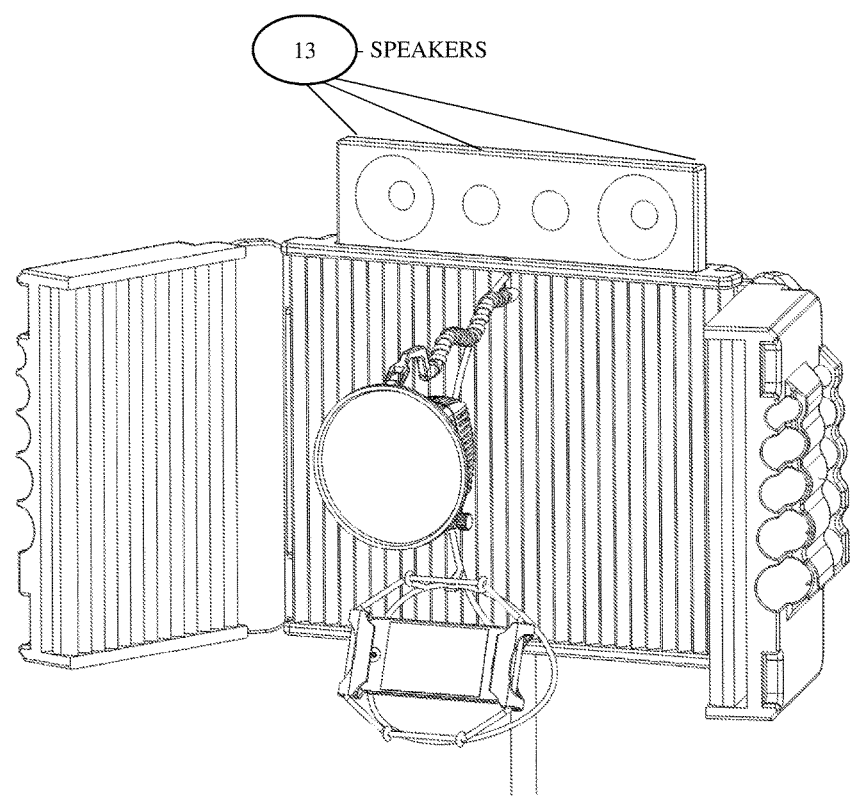
FIG. 13 illustrates an embodiment of how the speaker accessory can be slid unto the product in order to give a high quality studio sound playback.

FIG. 13 illustrates how add-on speakers 13 can be attached to the main unit 1, as either external from the portable assembly, folded up or otherwise connected in the assembly to form a single modular unit as the portable studio assembly. These speakers can be used to give the user better feedback when playing back their recordings. It can further allow the user to hear their recordings out loud so that can hear how the audio will sound coming directly from speakers. Alternatively or additionally, a set of head phones can wirelessly or by wire connect to the speakers, microphone, the mobile phone, another recording device or a combination thereof.

Figure 14:
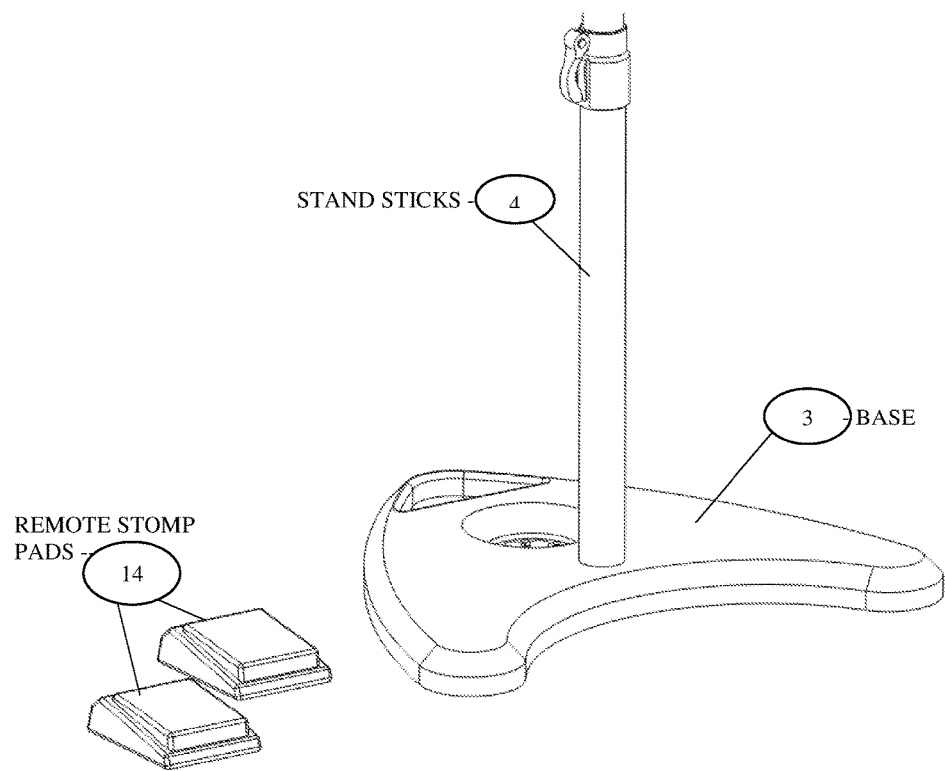
FIG. 14 illustrates an embodiment of accessory stomping pads that act as a remote control to control a cellular phone or other audio studio component.

FIG. 14 illustrates the remote stomp pads 14. These can be used to control the control panel without having to touch the cell phone. These are used so that the user wouldn't have to move the pop filter 8 every time they want to record. If user had to move the pop filter 8 every time they record, then most likely the sound from opening and closing would be heard in the recording. The remote stomp pads 14 could be connected to the mobile phone, the microphone or speakers as well as an amplifier by a USB cord, other connection or wirelessly. The stomp pads 14 could further be configured to manipulate or control various equalizer functions such as programmed settings within the application of the mobile device.

Figure 15:
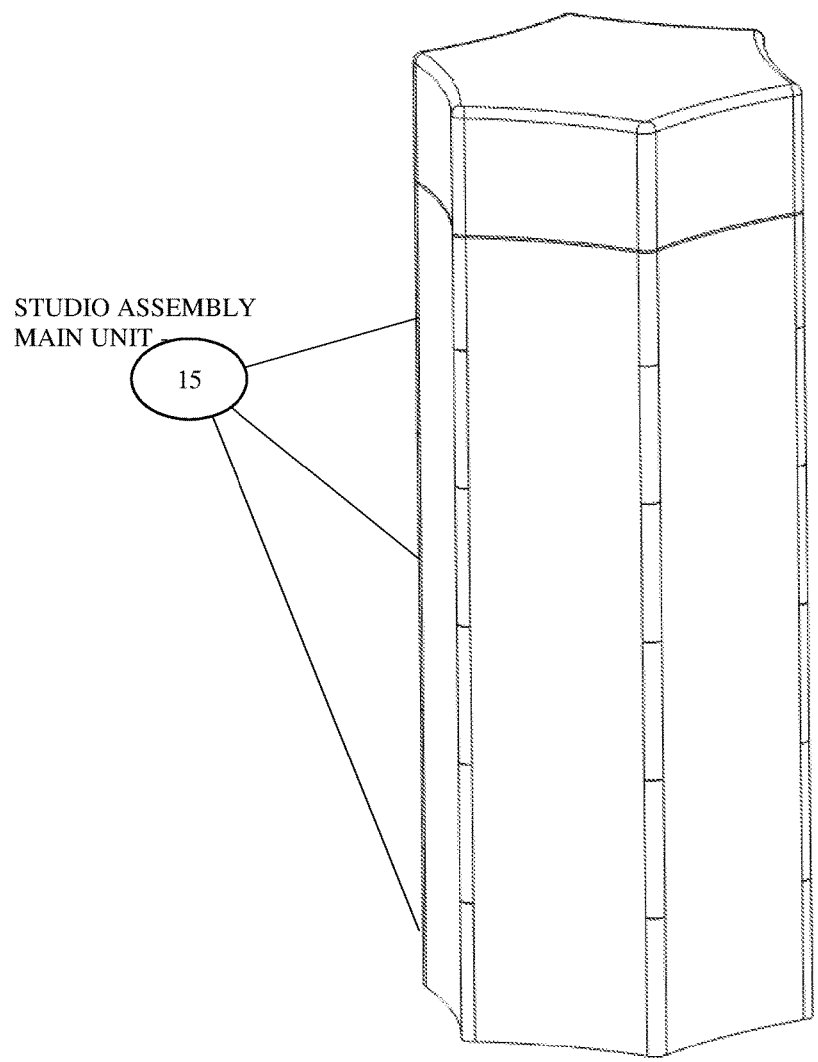
FIG. 15 illustrates an embodiment of the alternative portable audio assembly demonstrating how the contents are placed and configured on the inside of the portable audio assembly.

FIG. 15 illustrates the alternative modular studio assembly or portable studio assembly or kit as a main unit 15. This unit 15 illustrates another aspect or additional embodiment from the suitcase carrying design discussed above with the main base 1 in an assembled and portable configuration demonstrated in FIG. 1, for example.

Figure 16:
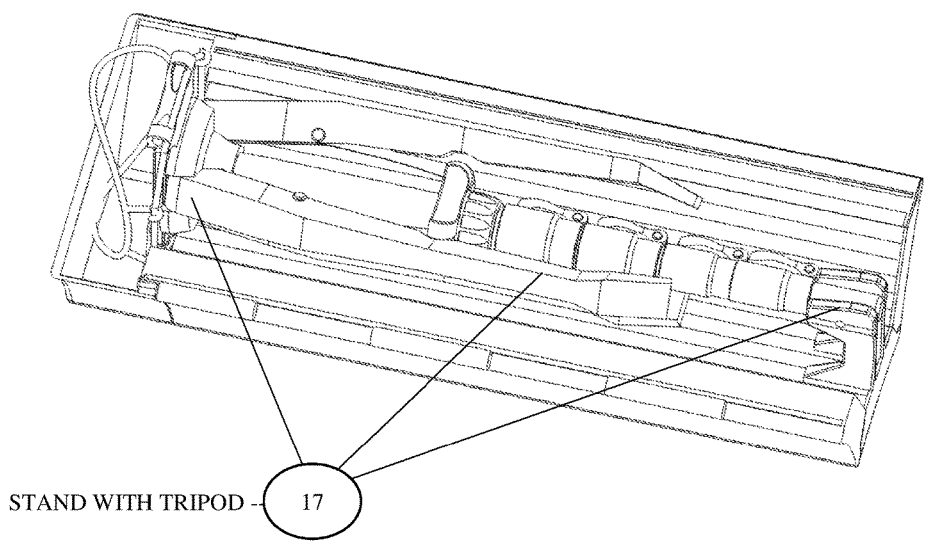
FIG. 16 illustrates an exploded view of the alternative audio studio unit in accordance with various aspects being disclosed.

FIG. 16 illustrates an exploded view of the alternative main unit 15. This view illustrates how the stand with a tripod 17 conveniently fits into the alternative main unit 15.

Figure 17:
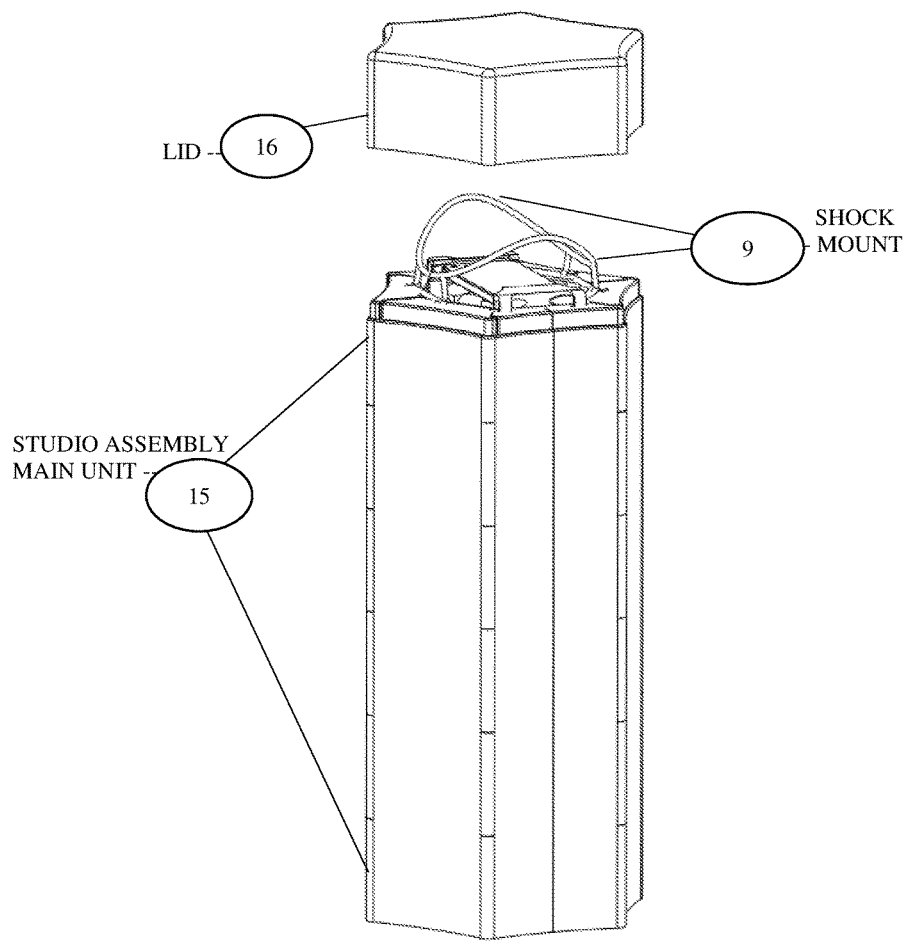
FIG. 17 illustrates an embodiment of how the lid comes off of alternative portable audio assembly unit to enable a fully open state.

FIG. 17 illustrates the lid 16 being taken or lifted off of the alternative main unit 15, which reveals the shock mount/phone holder 9 with a mobile phone or other recording device being held therein.

Figure 18:
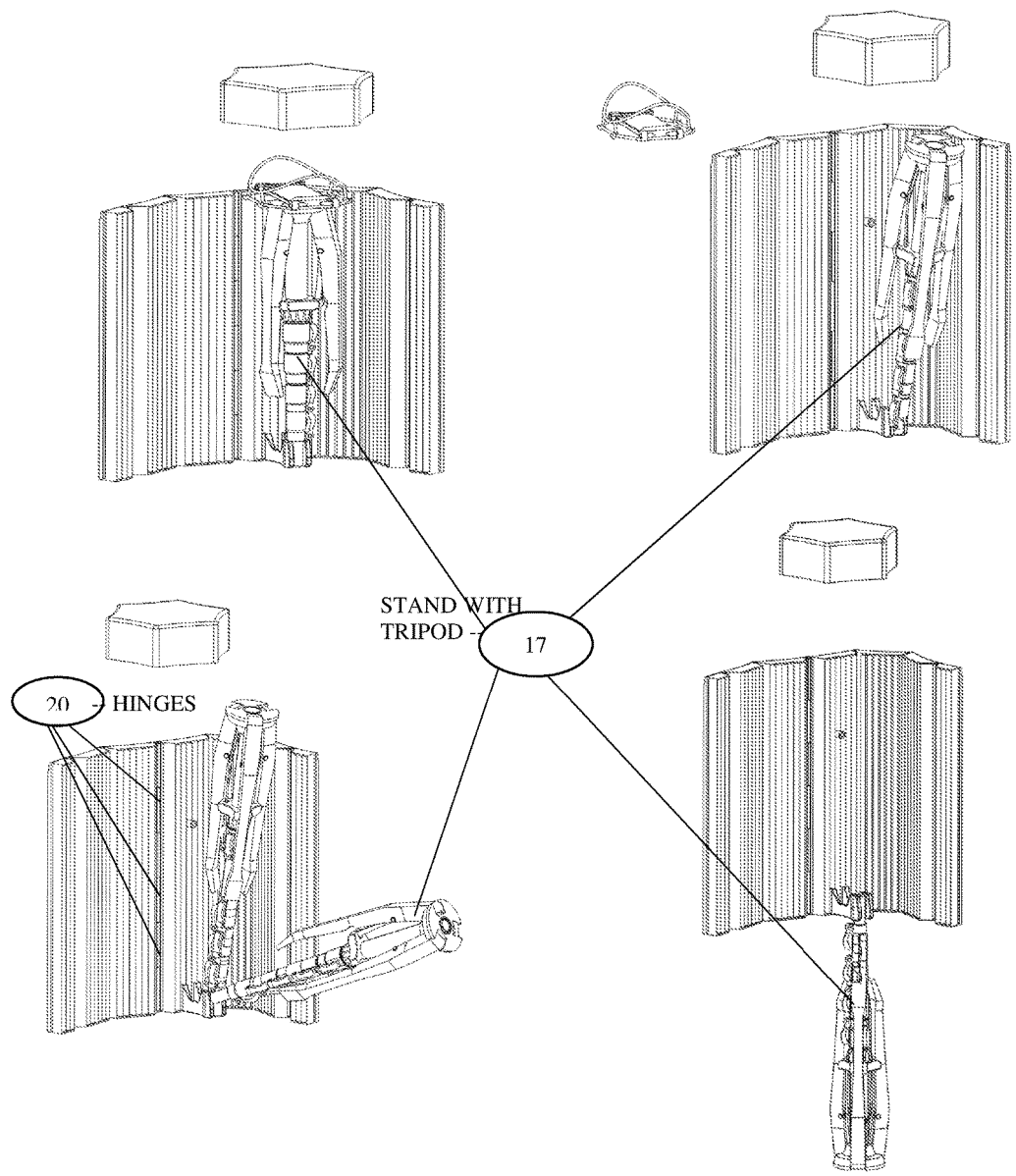
FIG. 18 illustrates a view of the alternate portable audio assembly unit that demonstrates how the stand comes out of it in accordance with various aspects being disclosed.

Illustrated in FIG. 18, the alternative main unit 15 is shown open. The hinges 20 between the foam filters 6 allows the alternative main unit 15 to be opened up to form a reflective filter. The stand with tripod 17 can come out in order to form the stand for the alternative main unit, such as by a hinging action or hinge mechanism 20, which enables the stand to remain fixedly attached to the alternative main unit 15. The stand with tripod 17 can fold down and based legs hinged out with any number of feet or based legs thereat (e.g., three, four or otherwise). The bracket, mobile phone or recording device, and shock mount/phone holder can be removed for an extension of the stand with tripod 17 for example, and then further reattached in a position that can be adjusted to optimize the angle of the mobile phone as a recording device.

Figure 19:
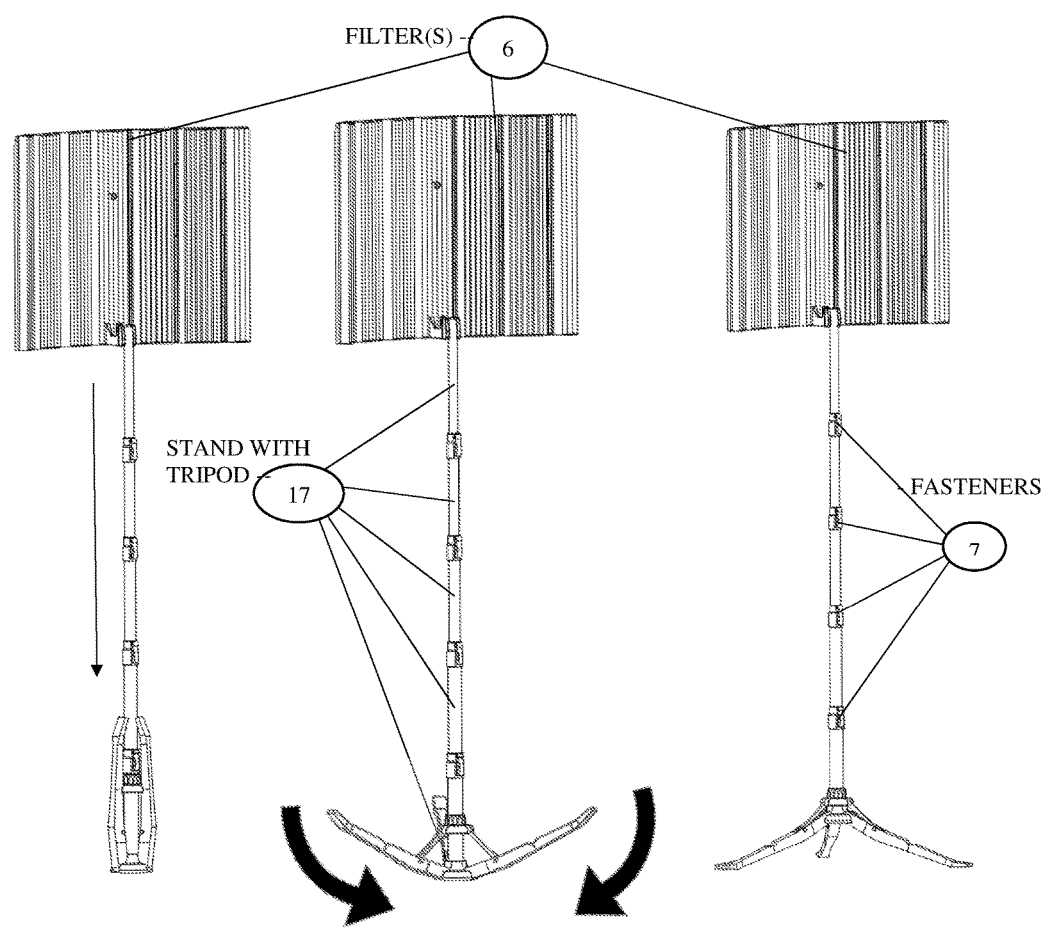
FIG. 19 illustrates a view of how the alternate portable audio assembly unit fully opened and assembled.

FIG. 19 illustrates how the stand with tripod 17 looks when fully open. FIG. 19 illustrates how the alternative main unit 15 looks when transformed into the final product. As stated above, the stand with tripod 17 can be assembled or extended with different sections as well by pole locks or fasteners 7, or otherwise extended telescopically or screwed together. The foam filter 6 can be unfolded in sections and positioned to further optimize reflection of external noise and concentration of internal audio or vocals.

Figure 20:
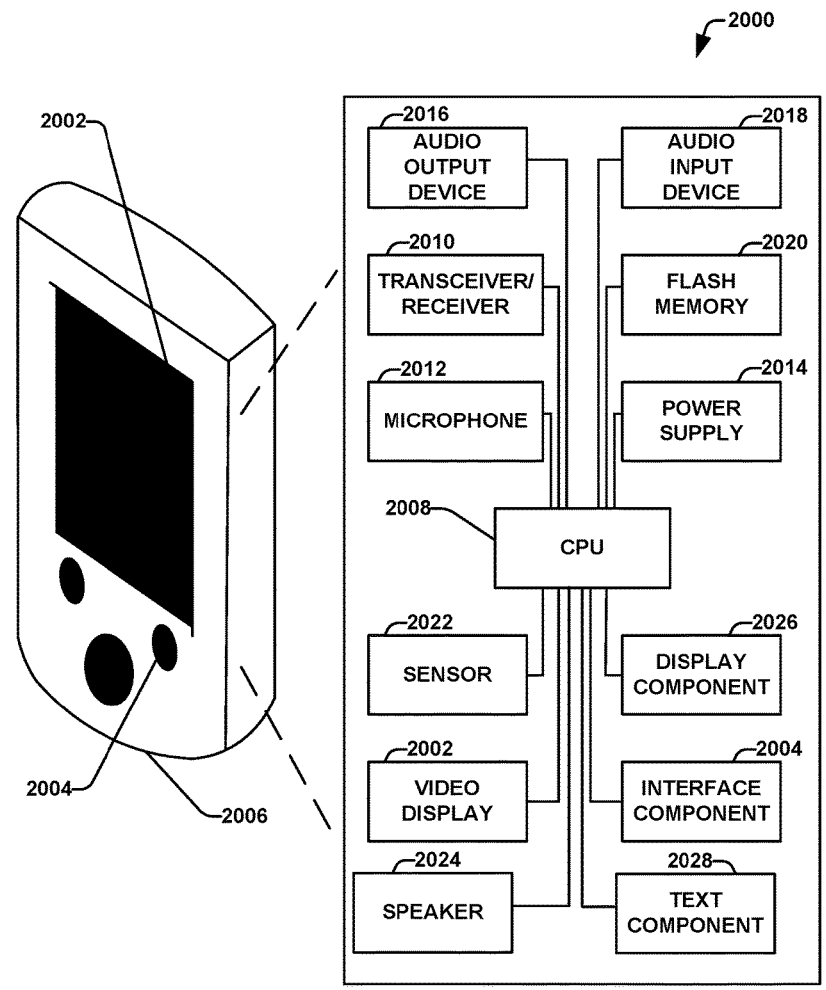
FIG. 20 is an isometric view of an example of a mobile/wireless device and block diagram according to one or more aspects of the present disclosure.

FIG. 20 is an exemplary mobile device that can be used as a recording or audio studio device with an equalizer and voice setting application, for example, a Personal Data Assistant (PDA) 2000 comprising a video display 2002, an interface component 2004, a housing 2006, a CPU 2008, a transceiver and/or a receiver 2010, a microphone 2012, a power supply 2014, an audio output device 2016, an audio input 2018, flash memory 2020, various sensors 2022, speaker(s) 2024, a display component 2026, and a text component 2028. The flash memory 2020 utilizing dual bit and single bit memory devices manufactured with an improved buffering system and hybrid arbitration mechanism to improve read/write performance and provide low latency for mobile systems reduce reliability and density by an x decoding circuit capable of reducing the number of sector selects per sector and accessing a particular core sector by concurrently providing an accessing voltage and an inhibiting voltage, per the present invention. The audio input device 2018 can be a transducer, for example. The interface component 2004 can include a keypad, buttons, dials, pressure keys, and the like. The video display 2002 can be a liquid crystal display, a plasma display, an LED display, and the like, for displaying visual data and information. In accordance with another embodiment of the claimed subject matter, the portable device with flash memory 2020 comprises cell phones, memory sticks, flash drive devices, video camcorders, voice recorders, USB flash drives, fax machines, flash memory laptops, MP3 players, digital cameras, home video game consoles, hard drives, memory cards (used as solid-state disks in laptops), and the like. The flash memory 2020 can include random access memory, read only memory, optical memory, audio memory, magnetic memory, and the like.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the processes and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

Example 1 is a kit for a portable audio recording studio assembly comprising: a portable carrying case configured to hold portable studio components that when assembled together form an audio studio to record or produce an audio recording, the portable studio component comprising: a filter covering a plurality of surfaces within the portable carrying case and configured to filter noise during the audio recording, wherein the portable carrying case is configured to expose the plurality of surfaces to filter the noise with the filter in response to being in an open position; a shock mount holder configured to brace a mobile phone communicatively coupled to a microphone to receive or generate the audio recording; a plurality of stand sticks configured to form a studio support stand in response to being joined together or locked in a support position; and a base configured to support or hold the portable studio components of the portable studio audio assembly.

Example 2 includes the subject matter of Example 1, wherein the mobile phone is configured to record, play, pause, and edit the audio while coupled to the shock mount holder.

Example 3 includes the subject matter of any one of Examples 1-2, including or omitting optional elements, further comprising: a pop filter, connected to the shock mount holder, configured to prevent plosives and enhance a vocal sound during the audio recording.

Example 4 includes the subject matter of any one of Examples 1-3, including or omitting optional elements, further comprising: a wheel knob configured to secure the base to the portable carrying case prior to assembly of the audio studio.

Example 5 includes the subject matter of any one of Examples 1-4, including or omitting optional elements, wherein the base comprises a handle portion configured to enable carrying of the portable carrying case.

Example 6 includes the subject matter of any one of Examples 1-5, including or omitting optional elements, wherein the filter comprises a plurality of foam elements that traverse the plurality of surfaces within the portable carrying case to partially surround or encompass the shock mount holder with the mobile phone to receive or generate the audio recording while filtering the noise.

Example 7 includes the subject matter of any one of Examples 1-6, including or omitting optional elements, wherein the plurality of stand sticks are fixedly attached to and fold out of an interior of the portable carrying case, and configured to variable adjust to a variable height.

Example 8 is a portable audio recording studio apparatus for generating an audio recording comprising: a main unit configured to hold portable studio components that when assembled together form an audio studio to record or produce the audio recording, the portable studio components comprising: a filter, configured to selectively absorb and reflect sound waves, comprising a plurality of foam filters; a plurality of stand sticks selectively connected to the main unit, configured to provide an adjustable height to the main unit; a base unit configured to support the plurality of stand sticks and the main unit when connected to the plurality of stand sticks; a microphone configured to record an audio signal; wherein the main unit, the plurality of stand sticks, the base unit and the microphone are configured to be portable by being re-assembled and attached to one another in a different configuration.

Example 9 includes the subject matter of Example 8, wherein the microphone is connected to a mobile device, wherein the mobile device is configured to record the audio recording from the microphone.

Example 10 includes the subject matter of any one of Examples 8-9, including or omitting optional elements, wherein the portable studio components further comprise a mic horn configured to selectively attach to the mobile device and create a tunnel from the microphone to a front of the mobile device, wherein the mobile device comprises the microphone.

Example 11 includes the subject matter of any one of Examples 8-10, including or omitting optional elements, further comprising a plurality of stomp pads wirelessly connected to the mobile device, configured to control a plurality of settings on the mobile device, the plurality of settings comprising an equalizer setting or a program setting on the mobile device that is related to the audio recording.

Example 12 includes the subject matter of any one of Examples 8-11, including or omitting optional elements, wherein the portable studio components further comprise a shock mount holder connected within the filter of the main unit, configured to hold the mobile device at a position, adjust the position of the mobile device to a desired position, and prevent vibration from the plurality of stand sticks from interfering with the audio recording.

Example 13 includes the subject matter of any one of Examples 8-12, including or omitting optional elements, further comprising: a pop filter connected to the shock mount holder, wherein the shock mount holder is configured to hold the pop filter in front of the microphone according to an adjustable position; and a plurality of speakers communicatively coupled to the main unit or a mobile phone comprising the microphone.

Example 14 includes the subject matter of any one of Examples 8-13, including or omitting optional elements, wherein the plurality of stand sticks and the base unit are configured to fold within the main unit or attach externally to the main unit for carrying.

Example 15 is a portable audio recording studio system, comprising: a portable carrying case configured to hold portable studio components that when assembled together form an audio studio to record or produce an audio recording, the portable studio component comprising: a main unit comprising a filter covering a plurality of surfaces within the portable carrying case and configured to filter noise during the audio recording, wherein the main unit is configured to expose the plurality of surfaces to filter the noise with the filter in response to being in an open position; a shock mount holder configured to brace a mobile phone at an adjustable distance away from the main unit, wherein the mobile phone is communicatively coupled to a microphone to receive or generate the audio recording; a one or more stand sticks configured to form a studio support stand in response to being joined together or locked in a support position with the portable carrying case; and a base configured to support or hold the portable studio components.

Example 16 includes the subject matter of Example 15, including or omitting optional elements, further comprising: a pop filter, connected to the shock mount holder, configured to prevent plosives and enhance a vocal sound during recording of the audio recording via the microphone.

Example 17 includes the subject matter of any one of Examples 15-16, including or omitting optional elements, further comprising: a wheel knob configured to secure the base to the portable carrying case prior to assembly of the audio studio.

Example 18 includes the subject matter of any one of Examples 15-17, including or omitting optional elements, wherein the base comprises a handle portion configured to enable carrying of the portable carrying case.

Example 19 includes the subject matter of any one of Examples 15-18, including or omitting optional elements, wherein the filter comprises a plurality of foam elements that traverse the plurality of surfaces within the portable carrying case to partially surround or encompass the shock mount holder with the mobile phone to receive or generate the audio recording while filtering the noise; wherein the one or more stand sticks are fixedly attached to and fold out of an interior of the portable carrying case, and configured to variably adjust to a desired height; and wherein the shock mount holder is connected within the filter of the main unit, configured to hold the mobile phone at a position, adjust the position of the mobile phone a desired position, and prevent vibration from the studio support stand from interfering with the audio recording.

Example 20 includes the subject matter of any one of Examples 15-19, including or omitting optional elements, further comprising: a plurality of stomp pads wirelessly connected to the mobile phone, configured to control a plurality of settings on the mobile phone, the plurality of settings comprising an equalizer setting or a program setting that is related to a parameter of an audio signal of the audio recording; a pop filter connected to the shock mount holder, wherein the shock mount holder is configured to hold the pop filter in front of the microphone according to an adjustable position; and a plurality of speakers communicatively coupled to the main unit or the mobile phone.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A kit for a portable audio recording studio assembly comprising:
a portable carrying case configured to hold portable studio components that when assembled together form an audio studio to record or produce an audio recording, the portable studio components comprising:
a filter covering a plurality of surfaces within the portable carrying case and configured to filter noise during the audio recording, wherein the portable carrying case is configured to expose the plurality of surfaces to filter the noise with the filter in response to a plurality of portions of the portable carrying case being folded outward in a horizontal left direction and a horizontal right direction and being in an open position, wherein a plurality of stand sticks are fixedly attached to and fold out of an interior center of the portable carrying case, surrounded by the filter covering the plurality of surfaces within the portable carrying case when closed, and;
the plurality of stand sticks configured to support the portable carrying case in response to being joined together or locked in a support position, wherein the plurality of stand sticks is fixed to the portable carrying case when the portable carrying case is closed; and
a base configured to support or hold the portable studio components of the portable studio assembly.

2. The kit of claim 1, further comprising:
a shock mount holder configured to brace a mobile phone communicatively coupled to a microphone to receive or generate the audio recording, wherein the mobile phone is configured to record, play, pause and edit the audio while coupled to the shock mount holder.

3. The kit of claim 2, further comprising:
a pop filter, connected to the shock mount holder, configured to prevent plosives and enhance a vocal sound during the audio recording.

4. The kit of claim 1, wherein the base comprises a handle portion configured to enable carrying of the portable carrying case.

5. The kit of claim 1, wherein the filter comprises a plurality of foam elements that traverse the plurality of surfaces within the portable carrying case to partially surround or encompass the shock mount holder with the mobile phone to receive or generate the audio recording while filtering the noise.

6. The kit of claim 1, wherein the plurality of stand sticks are configured to adjust to a variable height, and wherein adjacent portions of the plurality of portions of the portable carrying case are coupled by adjustable hinges.

7. A portable audio recording apparatus for generating an audio recording comprising:
a main unit configured to hold portable studio components that when assembled together form an audio studio to record or produce the audio recording, the portable studio components comprising:
a filter configured to selectively absorb and reflect sound waves, comprising a plurality of foam filters;
a plurality of stand sticks coupled to the main unit, configured to provide an adjustable height to the main unit, wherein the plurality of stand sticks are fixedly attached to and fold out of an interior center of the main unit, surrounded by the filter covering a plurality of surfaces within the main unit when closed;
a base unit configured to support the plurality of stand sticks and the main unit when coupled to the plurality of stand sticks;
a microphone configured to record an audio signal; and
wherein the main unit, the plurality of stand sticks, the base unit and the microphone are configured to be portable by being re-assembled and attached to one another in a different configuration.

8. The portable audio recording apparatus of claim 7, wherein the microphone is connected to a mobile device, wherein the mobile device is configured to record the audio recording from the microphone.

9. The portable audio recording apparatus of claim 8, wherein the portable studio components further comprise a mic horn configured to selectively attach to the mobile device and create a tunnel from the microphone to a front of the mobile device, wherein the mobile device comprises the microphone.

10. The portable audio recording apparatus of claim 8, further comprising a plurality of stomp pads wirelessly connected to the mobile device, configured to control a plurality of settings on the mobile device, the plurality of settings comprising an equalizer setting or a program setting on the mobile device that is related to the audio recording.

11. The portable audio recording apparatus of claim 8, wherein the portable studio components further comprise a shock mount holder connected within the filter of the main unit, configured to hold the mobile device at a position, adjust the position of the mobile device to a desired position, and prevent vibration from the plurality of stand sticks from interfering with the audio recording.

12. The portable audio recording apparatus of claim 11, further comprising:
a pop filter connected to the shock mount holder, wherein the shock mount holder is configured to hold the pop filter in front of the microphone according to an adjustable position; and
a plurality of speakers communicatively coupled to the main unit or a mobile phone comprising the microphone.

13. The portable audio recording apparatus of claim 7, wherein the plurality of stand sticks and the base unit are configured to fold within the main unit or attach externally to the main unit for carrying.

14. A portable audio recording studio system, comprising:
a portable carrying case configured to hold portable studio components that when assembled together form an audio studio to record or produce an audio recording, the portable studio components comprising:
a main unit comprising a filter covering a plurality of surfaces within the portable carrying case and configured to filter noise during the audio recording, wherein the main unit is configured to expose the plurality of surfaces to filter the noise with the filter in response to portions of the portable carrying case being folded outward in a horizontal left and right direction and being in an open position;
a shock mount holder configured to brace a mobile phone at an adjustable distance away from the main unit, wherein the mobile phone is communicatively coupled to a microphone to receive or generate the audio recording;
one or more stand sticks configured to support the portable carrying case in response to being joined together or locked in a support position, wherein the one or more stand sticks are fixed to the portable carrying case when the portable carrying case is closed, wherein the plurality of stand sticks are fixedly attached to and fold out of an interior of the portable carrying case, wherein the one or more stand sticks are fixedly attached to and fold out of an interior center of the portable carrying case, surrounded by the filter covering the plurality of surfaces within the main unit when the main unit is closed; and a base configured to support or hold the portable studio components.

15. The portable audio recording studio system of claim 14, further comprising:

a pop filter, connected to the shock mount holder, configured to prevent plosives and enhance a vocal sound during recording of the audio recording via the microphone.

16. The portable audio recording studio system of claim 14, wherein the base comprises a handle portion configured to enable carrying of the portable carrying case.

17. The portable audio recording studio system of claim 14, wherein the filter comprises a plurality of foam elements that traverse the plurality of surfaces within the portable carrying case to partially surround or encompass the shock mount holder with the mobile phone to receive or generate the audio recording while filtering the noise;

wherein the one or more stand sticks are fixedly attached to and fold out of an interior of the portable carrying case, and configured to variably adjust to a desired height; and wherein the shock mount holder is connected within the filter of the main unit, configured to hold the mobile phone at a position, adjust the position of the mobile phone to a desired position, and prevent vibration from the one or more stand sticks from interfering with the audio recording.

18. The portable audio recording studio system of claim 14, further comprising:

a plurality of stomp pads wirelessly connected to the mobile phone, configured to control a plurality of settings on the mobile phone, the plurality of settings comprising an equalizer setting or a program setting that is related to a parameter of an audio signal of the audio recording;

a pop filter connected to the shock mount holder, wherein the shock mount holder is configured to hold the pop filter in front of the microphone according to an adjustable position; and a plurality of speakers communicatively coupled to the main unit or the mobile phone.

19. The portable audio recording studio system of claim 14, wherein the one or more stand sticks are configured to extend telescopically and lock at adjustable heights in the support position, and wherein the one or more stand sticks are fixed to the portable carrying case via a hinge.

* * * * *